(12) United States Patent
Chang

(10) Patent No.: US 12,311,298 B2
(45) Date of Patent: May 27, 2025

(54) GAS DEFLECTOR

(71) Applicant: Wei-Ping Chang, Tainan (TW)

(72) Inventor: Wei-Ping Chang, Tainan (TW)

(*) Notice: Subject to any disclaimer, the term of this patent is extended or adjusted under 35 U.S.C. 154(b) by 415 days.

(21) Appl. No.: 18/080,710

(22) Filed: Dec. 13, 2022

(65) Prior Publication Data

US 2024/0165547 A1 May 23, 2024

(30) Foreign Application Priority Data

Nov. 23, 2022 (TW) .................................. 111144864
Nov. 23, 2022 (TW) .................................. 111212895

(51) Int. Cl.
*B01D 45/08* (2006.01)
(52) U.S. Cl.
CPC .................................... *B01D 45/08* (2013.01)
(58) Field of Classification Search
CPC .............. B01D 45/08; B08B 5/04; B08B 5/02
See application file for complete search history.

(56) References Cited

U.S. PATENT DOCUMENTS

2003/0066638 A1* 4/2003 Qu ........................ F22B 21/00
257/E23.11
2024/0165547 A1* 5/2024 Chang ...................... B08B 5/04

FOREIGN PATENT DOCUMENTS

TW  M623718 U  * 2/2022

* cited by examiner

*Primary Examiner* — Dung H Bui

(57) ABSTRACT

A gas deflector contains: a body and a guide unit. The body includes at least one inflow orifice, at least one outflow orifice, and multiple suction orifices. The guide unit includes a support plate, a through orifice, a conduct assembly, a collection assembly including a collecting channel, and a spray orifice. The conduct assembly includes two guiders, a drain orifice extending along the conduct assembly and corresponding to the through orifice and the collecting channel. The collection assembly corresponds to the drain orifice, and the collection assembly includes at least one collector sheet fixed on a bottom of the conduct assembly, and at least one gas conducting element received in the collecting channel. Furthermore, an exhaust channel is defined among the body, the collection assembly and the support plate, and the exhaust channel is in communication with at least one suction orifice of the multiple suction orifices.

16 Claims, 7 Drawing Sheets

GAS DEFLECTOR

FIELD OF THE INVENTION

The present invention relates to a gas deflector which is capable of simplifying components, reinforcing structure, and enhancing gas guiding and spraying effect.

BACKGROUND OF THE INVENTION

To improve a conventional gas circulator which is configured to suck and exhaust gas from a peripheral side of the gas circulator, the gas circulator contains a complicated channel, thus slowing a sucking speed of the conventional gas circulator and decreasing a dust removing and cleaning efficiency.

A conventional gas deflector is disclosed in TW Filing No. 110139304 and is applied to suck and exhaust gas vertically. The conventional gas deflector contains a body and a guide unit, wherein the gas is pumped in a vertical direction from an inlet of the body, and the gas impacts a gas conducting element and sprays out of a spout in the vertical direction via a guiding plate with a through orifice and a channel of a guide assembly evenly, thus spraying and cleaning the dusts. When removing the dusts, the dusts are sucked out of an outlet of the body from a suction orifice of the body via an exhaust passage surrounding the guide unit, thus removing and cleaning the dusts.

Thereby, the conventional gas deflector is capable of spraying and sucking the dusts in the vertical direction, and the dusts are sucked and sprayed in a short flowing path and a quick flowing speed. Preferably, the dust cleaning effect is multiplied. The guide unit includes at least one spraying space defined by two longitudinally inner fences and configured to accommodate the gas conducting element and the guide assembly, but such components are increased. In addition, a gas guising pate includes multiple through orifices defined on a laminated sheet to cause troublesome fabrication, and when a size of the conventional gas deflector is increased, for example, a horizontal length of the conventional gas deflector is enhanced, the laminated sheet will deform after being connected, thus reducing a service life. The present invention has arisen to mitigate and/or obviate the afore-described disadvantages.

SUMMARY OF THE INVENTION

The primary objective of the present invention is to provide a gas deflector which is capable of simplifying components, reinforcing a structure, and enhancing gas guiding and spraying effect.

To obtain the above objective, a gas deflector provided by the present invention contains: a body and a guide unit.

The body is a hollowly rectangle case, and the body includes at least one inflow orifice and at least one outflow orifice which are defined on a top of the body, and multiple suction orifices formed on a bottom of the body.

The guide unit is accommodated in the body, and the guide unit includes a support plate extending along the body, a through orifice passing through the support plate and corresponding to the at least one inflow orifice, a conduct assembly connected on a bottom of the support plate, a collection assembly connected on a bottom of the conduct assembly and including a collecting channel, and a spray orifice defined on a bottom of the collection assembly.

The conduct assembly includes two guiders, a drain orifice extending along the conduct assembly and corresponding to the through orifice and the collecting channel. The collection assembly corresponds to the drain orifice, and the collection assembly includes at least one collector sheet fixed on the bottom of the conduct assembly, and at least one gas conducting element received in the collecting channel. An exhaust channel is defined among the body, the collection assembly and the support plate. The exhaust channel is in communication with at least one suction orifice of the multiple suction orifices.

DETAILED DESCRIPTION OF THE PREFERRED EMBODIMENTS

Figure 1:
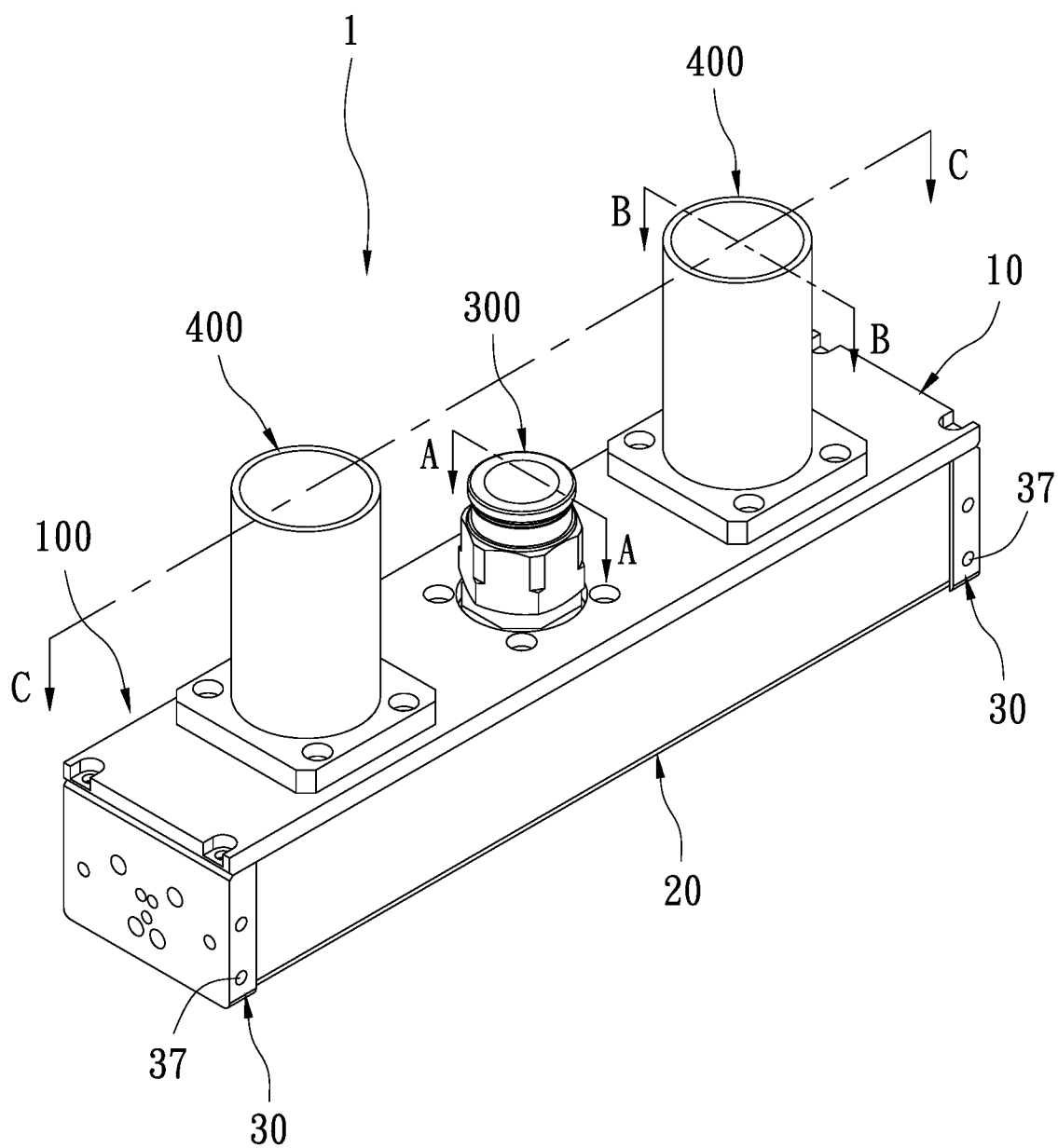
FIG. 1 is a perspective view showing the assembly of a gas deflector according to a first preferred embodiment of the present invention.
Figure 2:
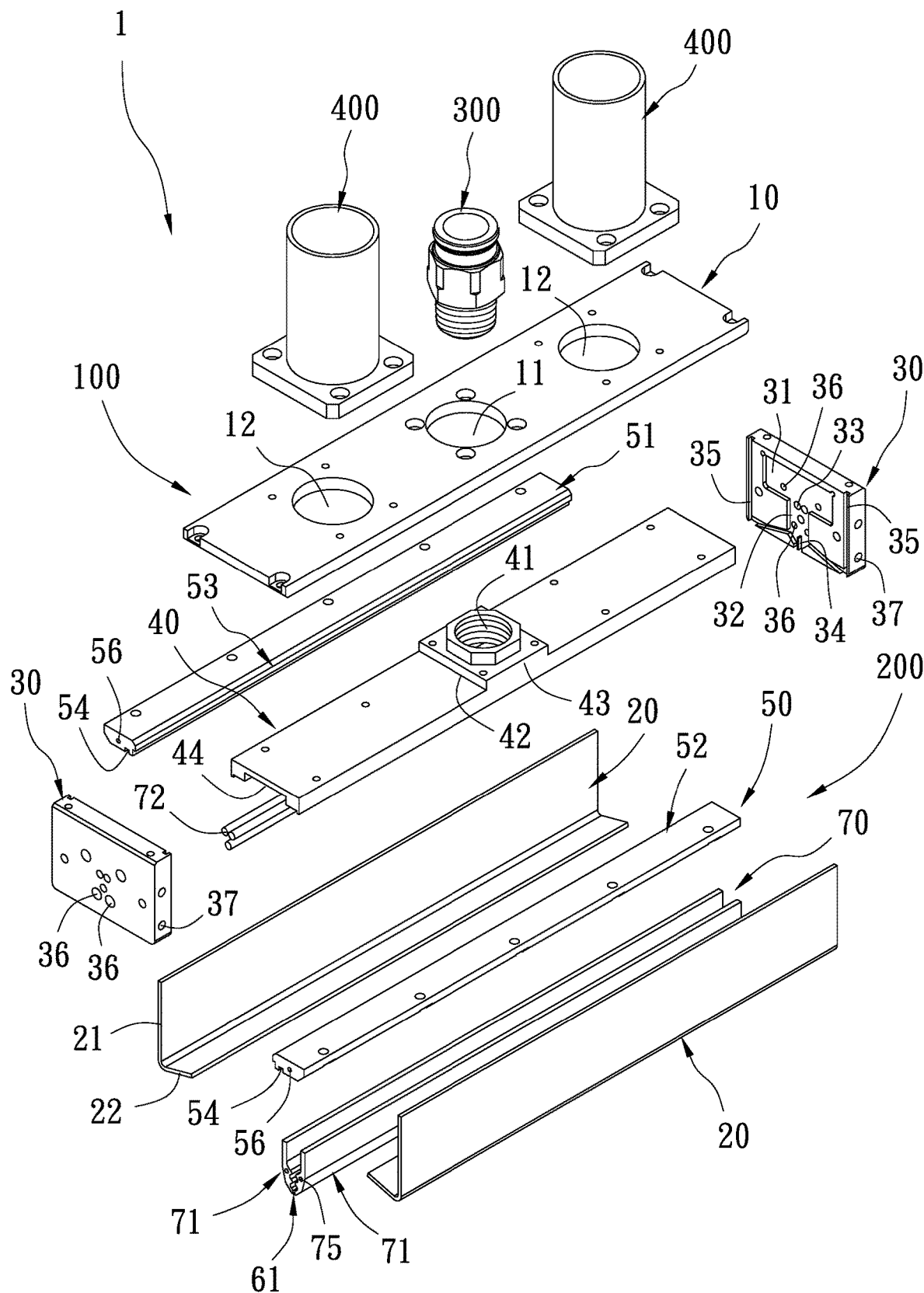
FIG. 2 is a perspective view showing the exploded components of the gas deflector according to the first embodiment of the present invention.

With reference to FIGS. 1 and 2, a gas deflector 1 according to a first embodiment of the present invention comprises: a body 100, a guide unit 200, at least one gas inlet 300, and at least one exhaust tube 400. The gas deflector 1 is configured to spray gas and suck dusts in a vertical direction, thus cleaning dusts quickly and effectively.

Figure 3:
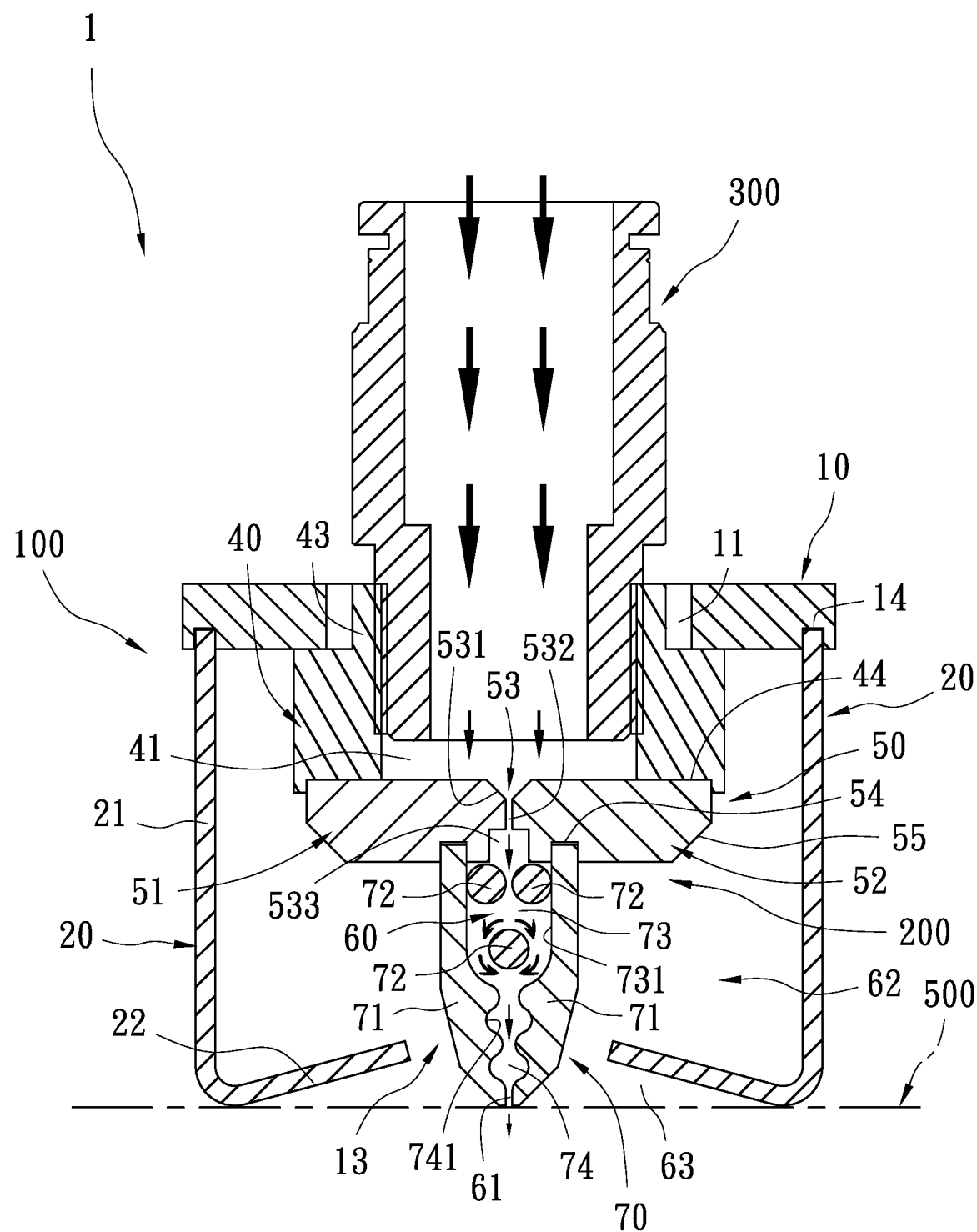
FIG. 3 is a cross sectional view taken along the line A-A of FIG. 1.

Referring to FIG. 3, the body 100 includes an elongated plate 10, two peripheral plates 20, and two caps 30 which are connected to form a hollowly rectangle case. The body 100 includes at least one inflow orifice 11 and at least one outflow orifice 12 which are defined on a top of the body 100, and multiple suction orifices 13 formed on a bottom of the body 100. In this embodiment, an inflow orifice 11 is defined on a middle portion of the elongated plate 10, and two outflow orifices 12 are defined beside the inflow orifice 11. In another embodiment, multiple inflow orifices 11 are defined on the middle portion of the elongated plate 10, and the at least one outflow orifice 12 are defined around the multiple inflow orifices 11, thus obtaining a balanced pressure.

The elongated plate 10 of the body 100 includes two connection portions 14 extending on two sides of the bottom of the elongated plate 10, and the two peripheral plates 20 are symmetrical and include an L-shaped cross section, two vertical peripheral fences 21 received in the two connection portions 14, and two bottom fences 22 extending inward from the vertical peripheral fences 21.

The two caps 30 are engaged on two ends of the two peripheral plates 20, and a respective one cap 30 includes a first groove 31, a second groove 32, at least one receiving orifice 33, a protrusion 34, and two longitudinal slots 35 defined on two sides of the respective one cap 30.

The guide unit 200 is accommodated in the body 100, and the guide unit 200 includes a support plate 40 extending along the body 100, a through orifice 41 passing through the support plate 40 and aligned with the at least one inflow orifice 11, a conduct assembly 50 connected on a bottom of the support plate 40, a collection assembly 70 connected on a bottom of the conduct assembly 50 and having a collecting channel 60, and a spray orifice 61 defined on a bottom of the collection assembly 70. An exhaust channel 62 is defined among the two peripheral plates 20, the collection assembly 70 and the support plate 40 of the body 100, and the exhaust channel 62 is in communication with the multiple suction orifices 13.

Figure 4:
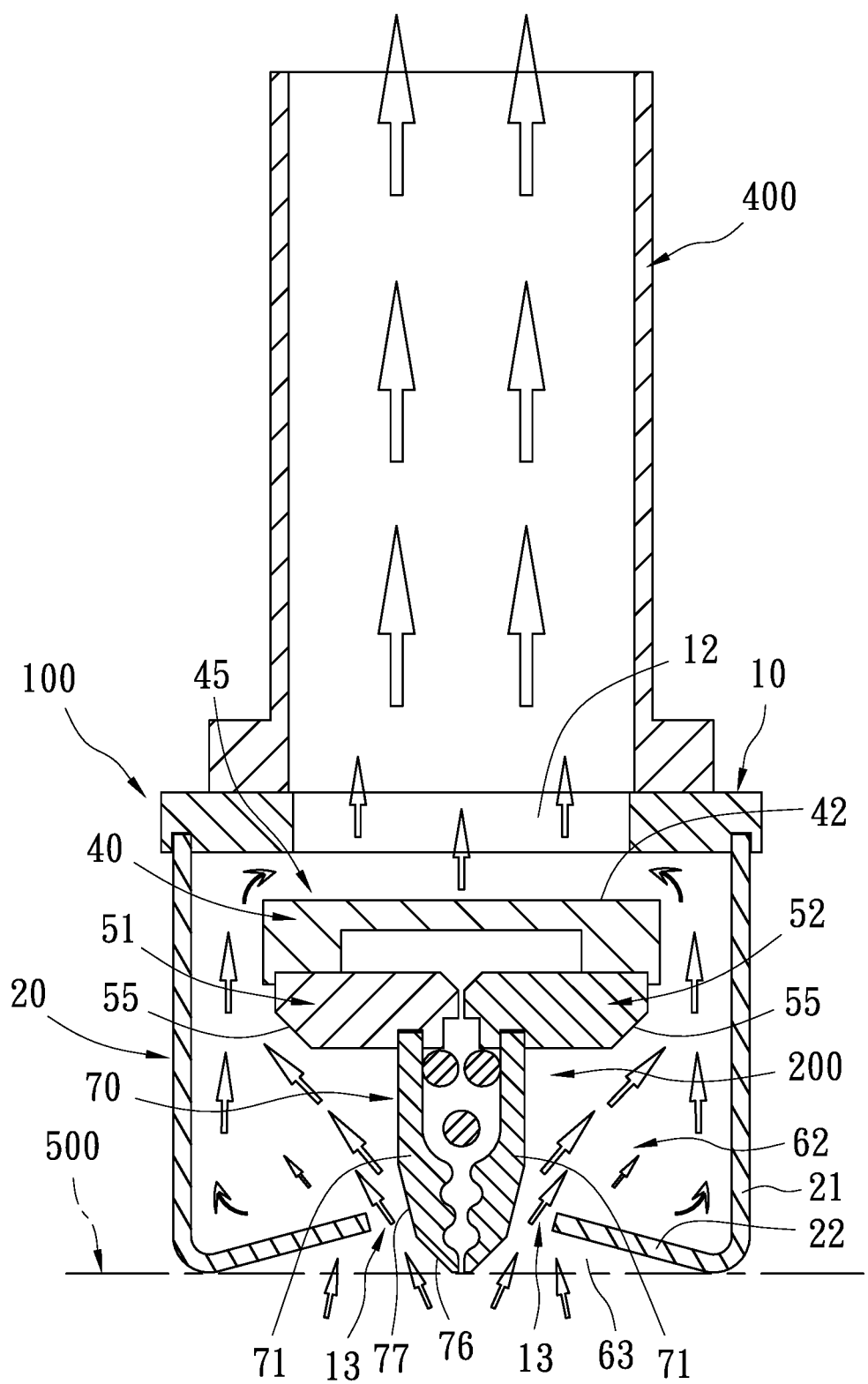
FIG. 4 is a cross sectional view taken along the line B-B of FIG. 1.

The support plate 40 includes a protruded stage 43 extending on a top of the support plate 40 and surrounding the through orifice 41, a stepped shoulder 42 formed on the protruded stage 43, and an inverted U-shaped engagement portion 44 extending on a bottom of the support plate 40. The stepped shoulder 42 extends along the support plate 40 and communicates with the exhaust channel 62, and a cavity 45 is defined between the stepped shoulder 42 of the support plate 40 and the body 100, as illustrated in FIG. 4.

The conduct assembly 50 includes two guiders 51, 52 which have two trapezoidal cross sections, a drain orifice 53 extending along the conduct assembly 50 and corresponding to the through orifice 41 and the collecting channel 60, and two coupling portions 54 extending along bottoms of the two guiders 51, 52. Tops of the guiders 51, 52 are engaged on the inverted U-shaped engagement portion 44 of the support plate 40. The drain orifice 53 is formed between the two guiders 51, 52, and the drain orifice 53 has a funnel 531 with a V-shaped cross section, a straight section 532, and a communication section 533 with an inverted U-shaped cross section, such that gas sprays out of the communication section 533 from the funnel 531 via the straight section 532 and flows into the collecting channel 60, hence the gas accelerates to flow after flowing out of the drain orifice 53.

A size of connecting the two guiders 51, 52 is more than a diameter of the through orifice 41 of the guide unit 200 so as to avoid a leakage of the gas, and the gas flows to the collecting channel 60 via the drain orifice 53, such that the guiders 51, 52 are configured to prevent a deformation caused by the gas in a high pressure. The two guiders 51, 52 are formed in an inverted trapezoid shape and have two first tilted fringes 55 formed on two outer sides of the two guiders 51, 52 adjacent to the two peripheral plates 20, such that when cleaning the dust and exhausting the gas, the two first tilted fringes 55 of the two guiders 51, 52 guide the gas quickly.

The collection assembly 70 corresponds to the drain orifice 53, and the collection assembly 70 includes at least one collector sheet 71 fixed on a bottom of the conduct assembly 50, and at least one gas conducting element 72 received in the collecting channel 60. A top of a respective one collector sheet 71 of the at least one collector sheet 71 is engaged on the two coupling portions 54 of the two guiders 51, 52.

In this embodiment, the respective one collector sheet 71 has a diameter-increasing section 73 and a diameter-decreasing section 74 formed below the diameter-increasing section 73, wherein the multiple gas conducting elements 72 are received in the collecting channel 60 (in this embodiment, three gas conducting elements 72 are received in the collecting channel 60), the multiple gas conducting elements 72 have an arcuate cross section, wherein the multiple gas conducting elements 72 are spaced and accommodated in the diameter-increasing section 73. The spray orifice 61 of the guide unit 200 is formed on a bottom of the respective one collector sheet 71 and is proximate to the diameter-decreasing section 74. In this embodiment, two collector sheets 71 of the collection assembly 70 are provided and are symmetrical, wherein the spray orifice 61 of the guide unit 200 is formed on a bottom of the respective one collector sheet 71 and communicates with the collecting channel 60, the diameter-increasing section 73 of the respective one collector sheet 71 is defined by two internal gathering faces 731, and the diameter-decreasing section 74 is defined by two waved faces 741 below the two internal gathering faces 731, wherein a diameter of the spray orifice 61 is fixed and is less than a largest diameter of the diameter-decreasing section 74, and the largest diameter of the diameter-decreasing section 74 is less than a diameter of the diameter-increasing section 73. After the gas sprays out of the drain orifice 53 of the conduct assembly 50, the gas further sprays out of the spray orifice 61 along the at least one gas conducting element 72 and the two waved faces 741 of the diameter-decreasing section 74.

The at least one gas inlet 300 is connected on the at least one inflow orifice 11 so as to pump an external gas into the body 100. In this embodiment, the external gas is pumped into the body 100 by an air pressure source provided by an air supply blower (not shown).

A number of the at least one exhaust tube 400 corresponds to a number of the at least one outflow orifice 12, and the at least one exhaust tube 400 is connected with the at least one outflow orifice 12 so as to pump the gas out of the body 100. In this embodiment, the gas is pumped out of the body 100 by a suction blower (not shown).

In this embodiment, all components of the gas deflector 1 are connected securely by using screws and threaded orifices or by welding. Since such a connecting is a well-known art, further remarks are omitted.

In connection, the elongated plate 10, the conduct assembly 50, the collection assembly 70, and the two caps 30 are arranged from the top to the bottom of the gas deflector 1, and the two caps 30 are engaged beside the elongated plate 10, the conduct assembly 50, the collection assembly 70 and the two caps 30, wherein the elongated plate 10 is fixed on the tops of the two caps 30 so that the support plate 40 and the two guiders 51, 52 are received in the first groove 31 of the respective one cap 30, the two collector sheets 71 are accommodated in the second groove 32 of the respective one cap 30, and the at least one gas conducting element 72 is received in the at least one receiving orifice 33 so that the two peripheral plates 20 are engaged in the two longitudinal slots 35 of the two caps 30, and the protrusion 34 of the respective cap 30 is engaged beside the spray orifice 61, then the screws are locked (or by the welding), thus connecting the elongated plate 10, the conduct assembly 50, the collection assembly 70, the two caps 30 and the support plate 40. In this embodiment, the conduct assembly 50 of the guide unit 200 is connected with the collection assembly 70 and the two caps 30 by engaging, wherein the two caps 30 include multiple first locking orifices 36, the two guiders 51, 52 have multiple second locking orifices 56, and the two collector sheets 71 have multiple third locking orifices 75, wherein the multiple first locking orifices 36, the multiple second locking orifices 56 and the multiple third locking orifices 75 are screwed by multiple screw bolts, hence a connection of the conduct assembly 50 and the collection assembly 70 is reinforced, and the gas is sucked and exhausted stably.

Figure 5:
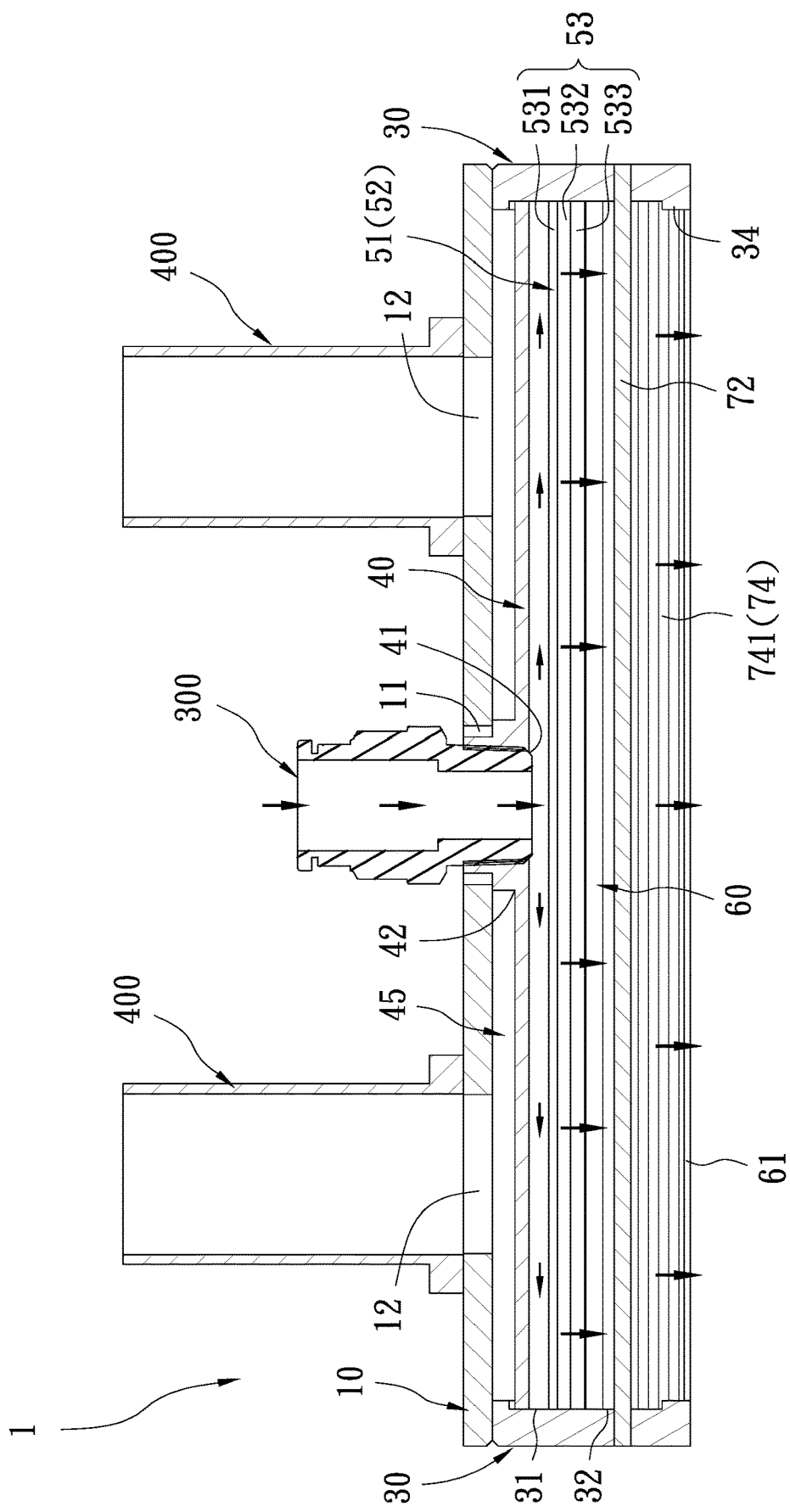
FIG. 5 is a cross sectional view taken along the line C-C of FIG. 1.

When sucking and cleaning the dusts by using the gas deflector 1, as shown in FIGS. 3 and 5, the gas is pumped from the at least one inflow orifice 11 of the elongated plate 10 to produce a first-time accelerated flowing via the through orifice 41 of the support plate 40, the drain orifice 53 between the two guiders 51, 52, the straight section 532, and the communication section 533 so that the gas flows into the collecting channel 60 evenly and quickly, wherein the gas is guided quickly and curvedly after flowing through the two waved faces 741 of the diameter-decreasing section 74 from the collecting channel 60 via the at least one gas conducting element 72, thereafter the gas sprays out of the spray orifice 61 to eliminate the dusts from objects. With reference to FIG. 4, the multiple suction orifices 13 suck the dusts vertically to flow out of the at least one exhaust tube 400 via the exhaust channel 62 of the guide unit 200, the cavity 45 of the stepped shoulder 42, and the at least one outflow orifice 12 of the elongated plate 10, thus cleaning and removing the dusts.

A profile of a bottom fence 22 of a respective one peripheral plate 20 tilts upward from a respective one vertical peripheral fence 21 of the respective one peripheral plate 20 to the collection assembly 70 so that a slit 63 is defined between the bottom fence 22 of the respective one peripheral plate 20 and the collection assembly 70. When removing the dusts and exhausting the gas, the slit 36 facilitates a quick suction of an object 500 (such as a display panel or touchscreen).

Figure 6:
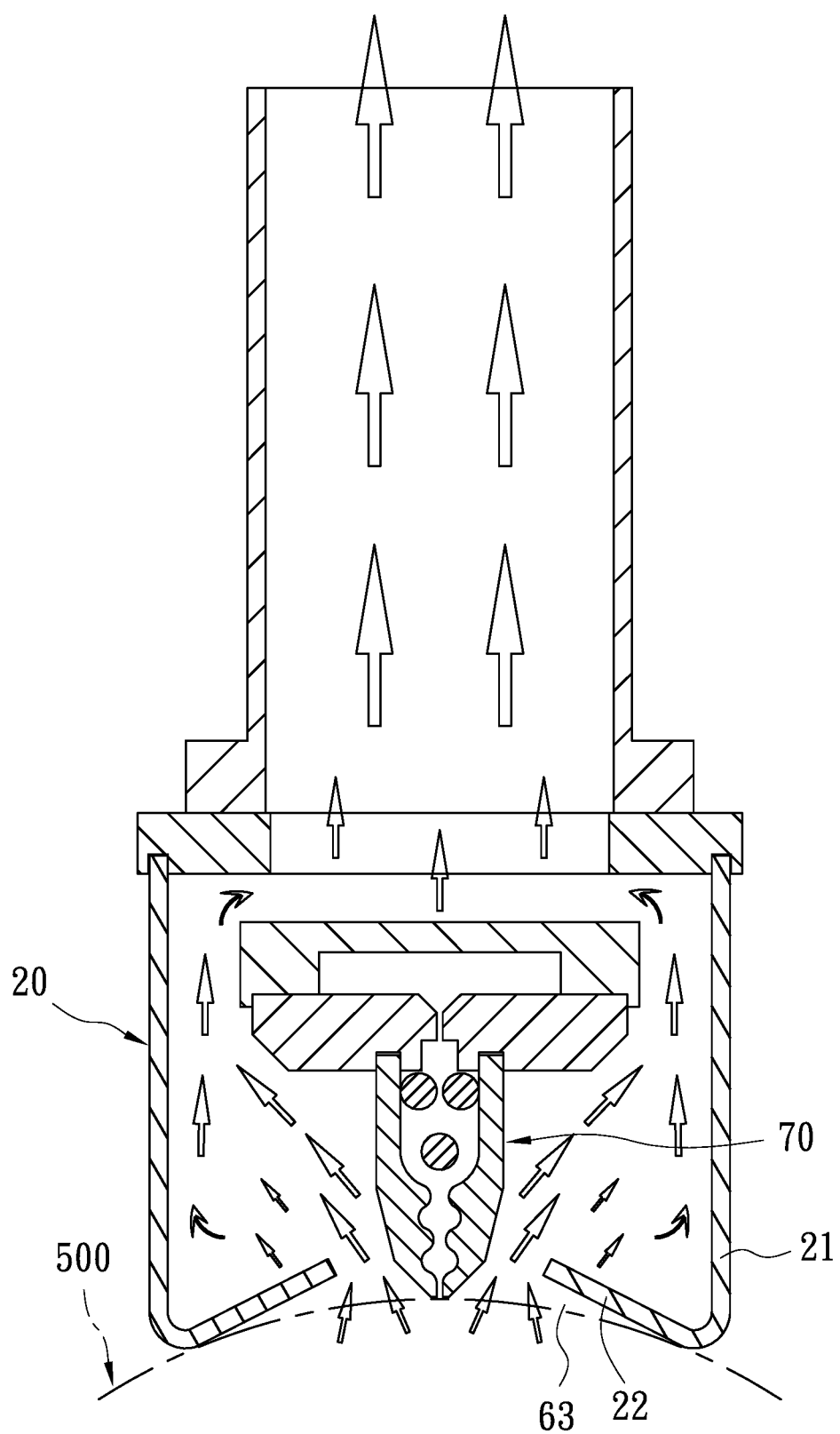
FIG. 6 is a cross sectional view of a gas deflector according to a second preferred embodiment of the present invention similar to FIG. 3.

Referring further to FIG. 6, to correspond to objects 500 of various shapes in a second preferred embodiment of the present invention, a beveled angle of the bottom fence 22 of the respective one peripheral plate 20 is adjustable, for example, the beveled angle of the respective one vertical peripheral fence 21 and the bottom fence 22 of the respective one peripheral plate 20 is decreased, and a size of the slit 63 between the bottom fence 22 of the respective one peripheral plate 20 and the collection assembly 70 is increased so as to be applicable for the arcuate object 500 to suck the dusts from the object strongly.

Figure 7:
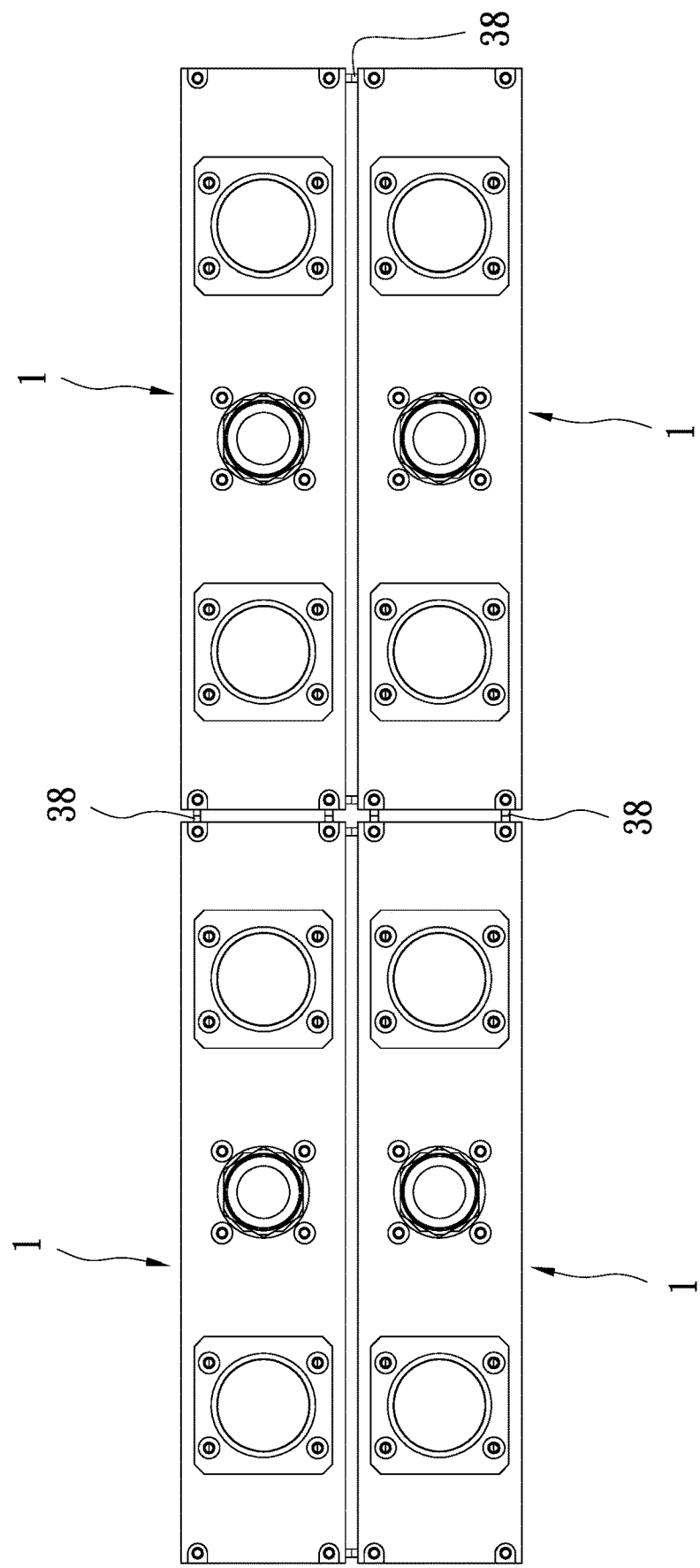
FIG. 7 is a side plan view showing the application of the gas deflector according to the present invention.

The respective one cap 30 of the body 100 includes multiple fixing orifices 37, as shown in FIGS. 1 and 2, such that multiple screwing elements 38 are configured to connect multiple gas deflectors 1, such as two gas deflectors 1 and four gas deflectors 1, as illustrated in FIG. 7.

Accordingly, the gas deflector of the present invention has advantage as follows:
1. The gas deflector of the present invention eliminates an inner sheet and an air transmission plate with laminated orifices to simplify components of the conventional gas deflector.
2. The components of the present invention are stacked, screwed, and engaged to secure structure and to prolong a service life.
3. The guide unit 200 is configured to guide the gas from the collection assembly 70 by way of the conduct assembly 50, the diameter-increasing section 73 and the diameter-decreasing section 74 of the respective one collector sheet 71 to produce vibration of the gas and to accelerate a flowing speed of the gas, thus spraying the gas effectively.
4. The drain orifice 53 between the two guiders 51, 52 is configured to accelerate the flowing speed of the gas and to absorb an impact of the gas in the high pressure, thus avoiding deformation and prolonging the service life. Furthermore, when a length of the gas deflector of the present invention is lengthened, the strength of the gas deflector of the present invention is enhanced.
5. The conduct assembly 50 includes the two guiders 51, 52 merely to avoid punching of the air transmission plate with the laminated orifices, thus saving a machining cost and simplifying a machining process.

It is to be noted that multiple second tilted fringes 76, 77 are formed on an outer side of the respective one collector sheet 71 of the collection assembly 70, thus enhancing air exhausting and accelerating a removal of the dusts and the gas, as shown in FIG. 4.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A gas deflector comprising:
   a body being a hollowly rectangle case, and the body including at least one inflow orifice and at least one outflow orifice which are defined on a top of the body, and multiple suction orifices formed on a bottom of the body;
   a guide unit accommodated in the body, and the guide unit including a support plate extending along the body, a through orifice passing through the support plate and corresponding to the at least one inflow orifice, a conduct assembly connected on a bottom of the support plate, a collection assembly connected on a bottom of the conduct assembly and including a collecting channel, and a spray orifice defined on a bottom of the collection assembly;
   wherein the conduct assembly includes two guiders, a drain orifice extending along the conduct assembly and corresponding to the through orifice and the collecting channel, wherein the collection assembly corresponds to the drain orifice, and the collection assembly includes at least one collector sheet fixed on the bottom of the conduct assembly, and at least one gas conducting element received in the collecting channel, wherein an exhaust channel is defined among the body, the collection assembly and the support plate, and the exhaust channel is in communication with the multiple suction orifices.

2. The gas deflector as claimed in claim 1, wherein the body includes an elongated plate, two peripheral plates, and two caps which are connected to form the hollowly rectangle case; the at least one inflow orifice and the at least one outflow orifice are defined on the elongated plate, and the multiple suction orifices are defined among the two peripheral plates and the at least one collector sheet of the collection assembly.

3. The gas deflector as claimed in claim 2, wherein the elongated plate of the body includes two connection portions extending on two sides of a bottom of the elongated plate, and the two peripheral plates are symmetrical and include an L-shaped cross section, two vertical peripheral fences received in the two connection portions, and two bottom fences extending inward from the vertical peripheral fences, wherein the multiple suction orifices are defined on two distal ends of the two bottom fence and the at least one collector sheet.

4. The gas deflector as claimed in claim 3, wherein a profile of a respective one bottom fence of a respective one peripheral plate tilts upward from a respective one vertical peripheral fence of the respective one peripheral plate to the collection assembly.

5. The gas deflector as claimed in claim 2, wherein a respective one cap includes a first groove, a second groove, at least one receiving orifice, and a protrusion, the support plate and the two guiders are received in the first groove of the respective one cap, two collector sheets are accommodated in the second groove of the respective one cap, the at least one gas conducting element of the collection assembly is received in the at least one receiving orifice, and the protrusion of the respective cap is engaged beside the spray orifice of the guide unit.

6. The gas deflector as claimed in claim 2, wherein the at least one inflow orifice is defined on a middle portion of the elongated plate and aligned with the through orifice of the support plate, and multiple outflow orifices are defined on the elongated plate and around the at least one inflow orifice.

7. The gas deflector as claimed in claim 1, wherein the through orifice of the guide unit is defined on a middle portion of the support plate and is aligned with the at least one inflow orifice, and the support plate includes a protruded stage extending on a top of the support plate and surrounding the through orifice, wherein a stepped shoulder is formed on the protruded stage, wherein the stepped shoulder extends along the support plate and communicates with the exhaust channel.

8. The gas deflector as claimed in claim 1, wherein the drain orifice is formed between the two guiders, and a diameter of connecting the two guiders is more than a diameter of the through orifice of the guide unit.

9. The gas deflector as claimed in claim 1, wherein the support plate of the guide unit includes an inverted U-shaped engagement portion extending on the bottom of the support plate, and tops of the two guiders are engaged on the inverted U-shaped engagement portion of the support plate.

10. The gas deflector as claimed in claim 1, wherein two coupling portions extend along bottoms of the two guiders of the conduct assembly, and a top of a respective one collector sheet of the at least one collector sheet is engaged on the two coupling portions of the two guiders.

11. The gas deflector as claimed in claim 1, wherein the drain orifice of the conduct assembly has a funnel with a V-shaped cross section, a straight section, and a communication section with an inverted U-shaped cross section.

12. The gas deflector as claimed in claim 1, wherein a respective one collector sheet of the collection assembly has a diameter-increasing section and a diameter-decreasing section formed below the diameter-increasing section, and the at least one gas conducting element extends along the collection assembly and is accommodated in the diameter-increasing section, wherein the spray orifice of the guide unit is formed on a bottom of the respective one collector sheet and is proximate to the diameter-decreasing section.

13. The gas deflector as claimed in claim 12, wherein the collection assembly includes two collector sheets which are symmetrical, the spray orifice of the guide unit is formed on the bottom of the respective one collector sheet and communicates with the collecting channel, the diameter-increasing section of the respective one collector sheet is defined by two internal gathering faces, and the diameter-decreasing section is defined by two waved faces below the two internal gathering faces.

14. The gas deflector as claimed in claim 12, wherein multiple gas conducting elements of the collection assembly are received in the collecting channel, the multiple gas conducting elements have an arcuate cross section, and the multiple gas conducting elements are spaced and accommodated in the diameter-increasing section of the respective one collector sheet.

15. The gas deflector as claimed in claim 1 further comprising: at least one gas inlet connected on the at least one inflow orifice of the body so as to pump an external gas into the body.

16. The gas deflector as claimed in claim 1 further comprising: at least one exhaust tube connected with the at least one outflow orifice of the body so as to pump gas out of the body.

* * * * *